Sept. 24, 1935. M. HELFENSTEIN 2,015,475
SPECTACLE GOGGLES
Filed May 21, 1934
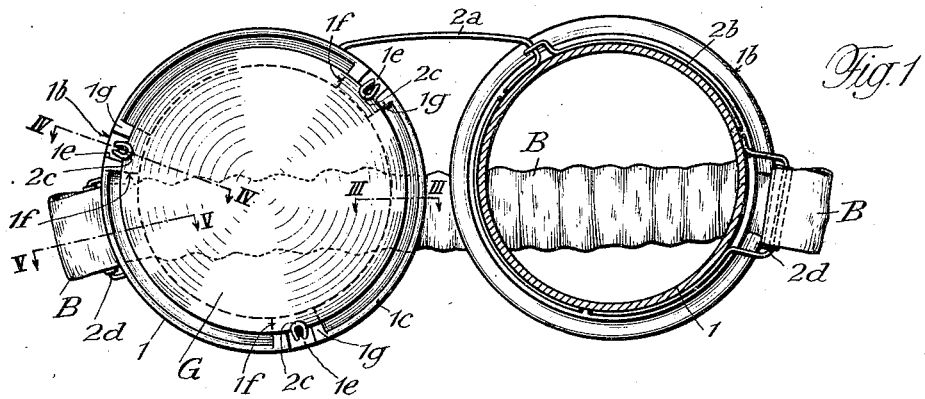
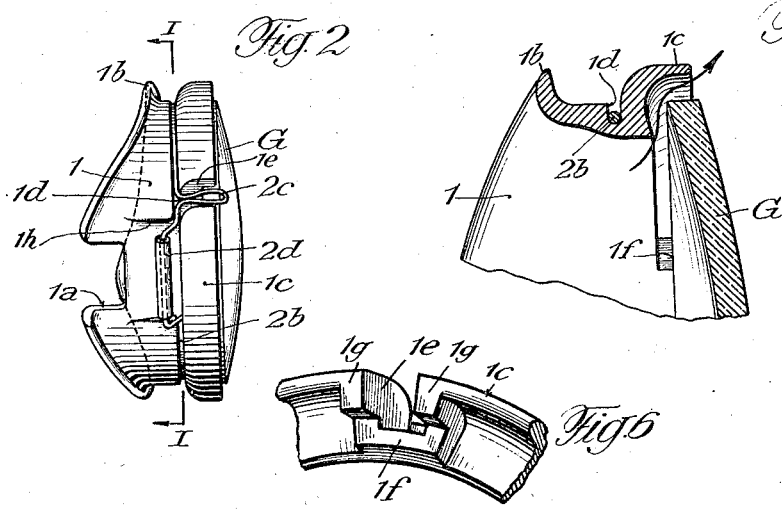
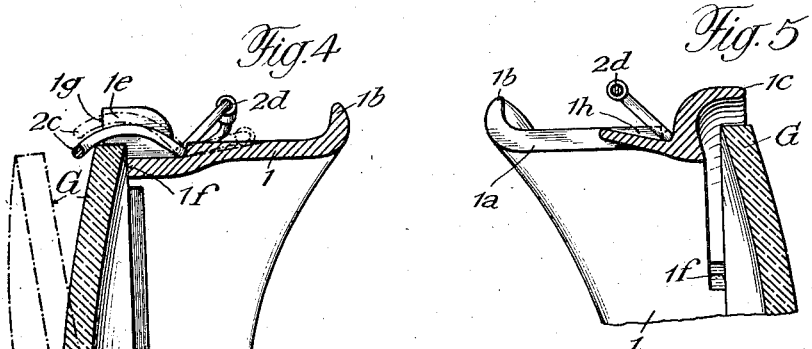
Inventor:
Max Helfenstein
By Sommers & Young.
Attys.

Patented Sept. 24, 1935

2,015,475

UNITED STATES PATENT OFFICE 2,015,475

SPECTACLE GOGGLES

Max Helfenstein, Lucerne, Switzerland, assignor to Schweizerische Unfallversicherungsanstalt, Lucerne, Switzerland Application May 21, 1934, Serial No. 726,797
In Switzerland February 14, 1934

5 Claims. (Cl. 2—14)

This invention relates to spectacle goggles which are intended for preventing accidents to the eyes by flying splinters, sparks or the like as well as by detrimental flashes of light as arising in welding iron or in furnaces used for industrial purposes or the like. The object of the invention is to improve on goggles of this type by providing a relatively simple and at the same time robust construction for the individual component parts together with a ready interchangeability for the lenses and other parts.

This is accomplished in the goggles according to the invention by mounting the eye cups that are made of compressed material in a wire frame which holds the lenses in detachable manner and which is provided with lateral staples to which an elastic fastening band is directly secured.

Even though eye cups that are made of a material such as ebonite, bakelite or the like are not of a strength equivalent to that of metal cups, goggles of this construction present sufficient resistivity since the wire frame takes the mechanical strain resulting from connecting the lenses to the eye cups and from fastening the goggles on the head.

Advantageously the rear edge of each eye cup, at the portion thereof which in wearing the goggles rests against the face, is correspondingly curved, so that, with the exception of a slot that may preferably be provided on the outside for the reception of ear straps of correcting glasses, the eye cup is a close fit all around the same. For increasing the protection afforded to the eye and to the lens, the front edge of the eye cup may be extended beyond the edge of the lens, the ventilating gap formed between the eye cup and the edge of the lens, which is suitably supported at a few points only, thus being laterally shielded all about the lens, in order to prevent splinters from protruding through this gap also.

In the accompanying drawing a form of the invention is shown by way of example only, in which Fig. 1 shows a front elevation of the goggles partly in section on the line I—I in Fig. 2, Fig. 2 shows a side elevation of the goggles with the fastening band omitted, Fig. 3 shows a larger scale section through the eye cup on the line III—III in Fig. 1;

Fig. 4 is a section on the line IV—IV in Fig. 1,

Fig. 5 is a section on the line V—V in Fig. 1, and

Fig. 6 is a perspective fragmentary view of an exterior rim on the eye cups taken at a portion of the rim for connecting the lens.

Referring to the drawing, the goggles are provided with two eye cups $1$ made of a compressed material and having a circular contour when seen in plan. The rear edges of the eye cups are curved in such manner that each edge follows precisely the configuration of the face, the outer portions of these edges above the temples being highest and provided with a rectangular notch $1a$. These notches serve for receiving the ear straps of correcting eye glasses for spectacled users.

For preventing the eye cups from cutting into the skin, the cups are provided with an outwardly projecting bead $1b$ all about the curved rear edge, thus providing for a broad bearing surface of the eye cups and consequently avoiding paining at the contacting portions of the goggles after long use, while at the same time the wall thickness is extremely small with a view to saving weight.

The front part of the eye cup is broadened so as to form an exterior hollow rim $1c$ at the rear side of which a groove $1d$ for the accommodation of a wire frame is formed. The front edge of this hollow rim is provided with three circumferentially equally spaced incisions $1e$ and projections $1f$ that are situated inwardly of these incisions at the side thereof, for supporting the lenses G, as well as flanges $1g$ for centering the lenses. In this manner an open ventilating gap is formed all about each lens, the diameter of which is slightly smaller than the inner diameter of the edge of the hollow rim, as well as underneath the lenses, as will be seen in Fig. 3.

Referring to the notch $1a$, the side wall is provided thereat with a recess $1h$ extending to the bottom of the groove $1d$ (Figs. 2 and 5). The wire frame is provided with a central yoke $2a$ (Fig. 1) which joins with the two annular holders $2b$ for the eye cups, the open end of these holders being bent in a hook so as to form a detachable connection with the yoke. Each annular cup holder is provided with three forwardly projecting inturned clips $2c$ which enter into the incisions $1e$ in the edge of the hollow rims, thus securing the lenses G in position. Immediately at the side of the exterior clip below the latter, the annular cup holder forms an obliquely outwardly projecting staple $2d$ to which the fastening band B which consists of elastic material is secured.

For interchanging one of the lenses, it is only necessary to depress the staple $2d$ from the position shown in full lines in Fig. 4 into that indicated by chain dotted lines. Consequent on this depression the clip 2c is moved out of its full line position into the chain dotted position, thus releasing the lens G so as to permit of removing the same as indicated in chain dotted lines. On releasing the staple 2d after having inserted a fresh lens, the clip 2c forces this lens into position of use on the respective eye cup.

Since the wire frame is bent up from a single piece of material, the manufacture of the frame is considerably facilitated and cheapened and as the frame is devoid of soldered connections danger of disruption is reduced to a minimum. Furthermore, a frame of this construction is very elastic, thus adapting itself readily to the configuration of the face. Moreover, for securing the lenses in position no special annular clamps or the like are required that easily become lost.

I do not limit myself to the particular size, shape, number or arrangement of parts as shown and described, all of which may be varied without going beyond the scope of my invention as shown, described and claimed.

What I claim is:

1. In spectacle goggles in combination eye cups of compressed material, the rearward edge of each of said eye cups being curved to conform to the part of the face of the wearer against which said rear edge comes to bear, an outwardly projecting bead on said edge providing a broadened bearing surface for the respective eye cup, a groove provided in the side wall of each eye cup, said side walls each having a laterally exteriorly disposed notch for the reception of the ear straps of correcting eye glasses as well as a recess situated above said notch and extending to the bottom of said groove, a wire frame received in said grooves and detachably interconnecting said eye cups, lateral staples provided on said wire frame, and an elastic fastening band for securing the goggles on the head of the wearer attached to said staples.

2. In spectacle goggles in combination eye cups of compressed material, the rearward edge of each of said eye cups being curved to conform to the part of the face of the wearer against which said rear edge comes to bear, an outwardly projecting bead on said edge providing a broadened bearing surface for the respective eye cup, a hollow rim provided on the front part of each eye cup, a projecting edge on each of said hollow rims having three circumferentially spaced incisions, a groove provided in the side wall of each eye cup, said side walls each having a laterally exteriorly disposed notch for the reception of the ear straps of correcting eye glasses situated a short distance below one of said incisions, which is disposed laterally exteriorly on the eye cup, as well as a recess situated above said notch and extending to the bottom of said groove, a wire frame received in said grooves and adapted for detachably interconnecting said eye cups, annular cup holders provided in said wire frame, inturned clips on said annular cup holders one each projecting into said incisions for securing the lenses on said cups, lateral staples provided on said wire frame, and an elastic fastening band for securing the goggles on the head of the wearer attached to said staples.

3. In spectacle goggles in combination eye cups of compressed material, the rearward edge of each of said eye cups being curved to conform to the part of the face of the wearer against which said rear edge comes to bear, an outwardly projecting bead on said edge providing a broadened bearing surface for the respective eye cup, a hollow rim provided on the front part of each eye cup, a projecting edge on each of said hollow rims having three circumferentially spaced incisions, projections on each eye cup for supporting the lens and providing an open ventilating gap to extend all about the latter so as to be shielded laterally by said projecting edge, radial flanges for centering the lens disposed laterally of said incisions, a groove provided in the side wall of each eye cup, said side walls each having a laterally exteriorly disposed notch for the reception of the ear straps of correcting eye glasses situated a short distance below one of said incisions, which is disposed laterally exteriorly on the eye cup, as well as a recess situated above said notch and extending to the bottom of said groove, a wire frame received in said grooves and adapted for detachably interconnecting said eye cups, annular cup holders in said wire frame, inturned clips on said annular cup holders one each projecting into said incisions for securing the lenses on said cups, lateral staples provided on said wire frame, and an elastic fastening band for securing the goggles on the head of the wearer attached to said staples.

4. In spectacle goggles in combination eye cups of compressed material, the rearward edge of each of said eye cups being curved to conform to the part of the face of the wearer against which said rear edge comes to bear, an outwardly projecting bead on said edge providing a broadened bearing surface for the respective eye cup, a hollow rim surface provided on the front part of each eye cup, a projecting edge on each of said hollow rims having three circumferentially spaced incisions, projections on each eye cup for supporting the lens and providing an open ventilating gap to extend all about the latter so as to be shielded laterally by said projecting edge, radial flanges for centering the lens disposed laterally of said incisions, a groove provided in the side wall of each eye cup, said side walls each having a laterally exteriorly disposed notch for the reception of the ear straps of correcting eye glasses situated a short distance below one of said incisions, which is disposed laterally on the eye cup, as well as a recess situated above said notch and extending to the bottom of said groove, a wire frame received in said grooves, annular cup holders provided in said wire frame, a yoke interconnecting said cup holders, hooks provided on said cup holders for detachably engaging said yoke, inturned clips on said annular cup holders one each projecting into said incisions for securing the lenses on said cups, lateral staples provided on said wire frame, and an elastic fastening band for securing the goggles on the head of the wearer attached to said staples.

5. In spectacle goggles in combination eye cups of compressed material, the rearward edge of each of said eye cups being curved to conform to the part of the face of the wearer against which said rear edge comes to bear, an outwardly projecting bead on said edge providing a broadened bearing surface for the respective eye cup, projections on each eye cup for supporting the lens and providing an open ventilating gap to extend all about the latter so as to be shielded laterally by said projecting edge, radial flanges for centering the lens disposed laterally of said incisions, a hollow rim provided on the front part of each eye cup, a projecting edge on each of said hollow rims having three circumferentially spaced incisions, a groove provided in the side wall of each eye cup, said side walls each having a laterally exteriorly disposed notch for the reception of the ear straps of correcting eye glasses situated a short distance below one of said incisions, which is disposed laterally on the eye cup, as well as a recess situated above said notch and extending to the bottom of said groove, a wire frame received in said grooves, annular cup holders provided in said wire frame, a yoke interconnecting said cup holders, hooks provided on said cup holders for detachably engaging said yoke, inturned clips on said annular cup holders one each projecting into said incisions for securing the lenses on said cups, two lateral staples on said wire frame one each provided immediately below the correlated inturned clip laterally exteriorly situated on said cup holders in a rearwardly outwardly flared disposition and adapted on depression to retract the adjacent clip from the respective lense by entering into the corresponding recess, and an elastic fastening band for securing the goggles on the head of the wearer attached to said staples.

MAX HELFENSTEIN.